May 31, 1955

W. L. ENGHAUSER 2,709,381

PIPE CLOSING MACHINE

Filed Oct. 28, 1952

INVENTOR.
Winford L. Enghauser.
BY Wood, Herron & Evans.
ATTORNEYS.

INVENTOR.
Winford L. Enghauser,
BY
Wood, Herron & Evans.
ATTORNEYS.

United States Patent Office 2,709,381
Patented May 31, 1955

2,709,381

PIPE CLOSING MACHINE

Winford L. Enghauser, Cincinnati, Ohio, assignor to Enghauser Manufacturing Company, Inc., a corporation of Ohio Application October 28, 1952, Serial No. 317,301

9 Claims. (Cl. 78—89)

This invention relates to a machine for producing by a swaging operation lengths of metal pipe, each having a closed end wall which forms a gas-tight seal. The closed pipes are used for manifolds on gas ranges and for other purposes in industry, and the present machine is adapted to produce such pipes at a rapid production rate.

In the past, one method of closing the end of the pipe has been by a spinning operation, as disclosed in the prior patent of Winford L. Enghauser, No. 1,939,770, issued December 19, 1933. This prior machine operates upon the principle of forcing a swaging tool into frictional engagement with the end portion of the spinning pipe, whereby the heat developed by the frictional engagement of the tool renders the end portion of the pipe sufficiently malleable to be spun into a rounded end wall.

Recently, the present applicant invented an apparatus and method of severing one long piece of pipe into two shorter pieces by a swaging operation which closes the pipe ends as an incident to the severing operation. This method and apparatus are disclosed in the copending application of Winford L. Enghauser, Serial No. 256,271, filed November 14, 1951. According to the copending application, the central portion of the pipe is heated until the metal is malleable, the pipe is rotated by imparting rotary motion to its opposite ends, and then the malleable portion is progressively constricted until two closed ends are formed and pinched off. For this purpose, two rotary swaging dies are disposed on opposite sides of the pipe, the dies being provided with complementary profiles which upon rotation of the dies, progressively constrict the malleable center portion of the pipe, the longitudinal area of constriction becoming less and less as the degree of constriction increases. The swaging dies are rotated by power and are arranged to complete one swaging operation upon each cycle of rotation.

The swaging machine of the present invention utilizes in a general way the method disclosed in the copending application and provides the same advantages. In other words, it forms two closed end pipes upon each operation, thus doubling the rate of production of the previously known methods and machines. Moreover, the present machine likewise progressively swages the end closure without imposing twisting forces upon the malleable portion of the pipe which tends to disturb the welded seam and produce a leak.

Generally speaking, therefore, it is an object of the present invention to provide a machine in which mechanical impact means are utilized to develop the swaging action and in this respect the two inventions differ from one another; however they are coextensive in that both utilize swaging dies which form two closed pipes upon each operation.

As distinguished from the rotary swaging dies of the copending application, the present machine utilizes a pair of swaging dies which engage the rotating pipe at diametrically opposite sides and which are driven toward one another under relatively high frequency power impulses or oscillations to progressively constrict the malleable portion of the pipe. This action imparts a conical or round shape to the malleable wall and finally pinches it off in a manner generally similar to that disclosed in the copending application.

The present machine utilizes a pair of opposed follow-up jaws which loosely support the two swaging dies. The dies are acted upon by respective rotary die oscillators journalled on the follow-up jaws and arranged to impart sustained power impulses to the dies while the jaws guide the dies and react against the dies in their movement toward one another. The swaging dies in their preferred form consist of a pair of rollers having complementary profiles corresponding to the configuration to be imparted to the pipe wall. The rollers are rotatably mounted with respect to the follow-up jaws so as to track upon the rotating surface of the pipe and thereby avoid excessive friction and wear.

The power impulses act upon the swaging rollers in opposite directions driving the rollers toward one another from diametrically opposite sides of the pipe so that the forces are neutralized with respect to one another and execute the swaging operation in the most rapid and efficient manner. The follow-up jaws are pivotally mounted in scissors fashion and are fed toward one another by a feeding apparatus which advances the jaws at a rate correlated to the advancement of the swaging rollers towards the central axis of the pipe. Thus the swaging force is derived from the power impulses or strokes acting upon the rollers, while the rollers are free to advance in steps relative to the jaws. The power impulses tend to separate the jaws, but the jaw feeding apparatus by forcing the jaws toward one another, at least partially, causes the jaws to react against the power impulses and thus provide continuous stepwise advancement of the dies.

The oscillations are applied to the dies at a rapid rate, in one example, the frequency being 3600 impulses per minute and the amplitude or stroke being .050 of an inch. At this frequency and stroke, a certain amount of momentum is imparted to the rapidly oscillating dies, whereby the power impulses are effective, at least partially, as impact forces which do not react against the follow-up jaws. Thus it may be said that the swaging strokes consist of a combination of blows and pressure impulses and that the follow-up jaws are effective to guide the dies and also to react against the pressure impulses. Since the die oscillators generate a hammer-like action with respect to the swaging dies, they are termed "rotary hammers" throughout the specification and claims.

The impulse frequency is relatively high in proportion to the rotary motion of the pipe, while the amplitude or rate of advancement of the rollers per impact is relatively minute. This relationship of rotary pipe motion and impulse roller feed produces a succession of relatively slight incremental advancements of the rollers which are sustained during repeated revolutions of the pipe. Thus a given point on the periphery of the pipe is subjected to repeated swaging impacts which produce a series of blended indentations in the pipe wall which are sufficiently minute to preserve the cylindrical contour and provide a smooth surface at completion of the operation.

The constriction is formed by relatively narrow ribs or lobes which delineate the profile of the swaging rollers. These ribs are complementary for the two rollers and each flares outwardly from its narrow outer face in opposite directions toward the periphery of the roller. During the swaging operation, the lobes form a relatively narrow constriction which increases lineally with respect to the pipe as the constriction progresses radially toward the axis of the pipe until the final pinch off of the wall at the end of the cycle.

Another more specific object of the present invention has been to provide an arrangement of rotary die osciliators or hammers which are mounted upon the respective movable follow-up jaws and in which both hammers are driven in common from a drive shaft which rotates upon the pivotal mounting axis of the jaws, whereby the driving system has no effect upon the pivotal movement of the jaws.

A further object has been to provide a machine in which the swaging rollers are provided with an operating stroke which adapts the machine to operate upon pipes having various diameters within working range of the swaging rollers. It will be understood that pipes of large diameter, which are beyond the limits of the swaging rollers, can be accommodated by installing in the machine swaging rollers having profiles suitable to the diameter of the pipe.

Various other features and advantages of the present invention will be more fully disclosed in the specification taken in conjunction with the drawings.

General arrangement

Figures 10, 11, 13:
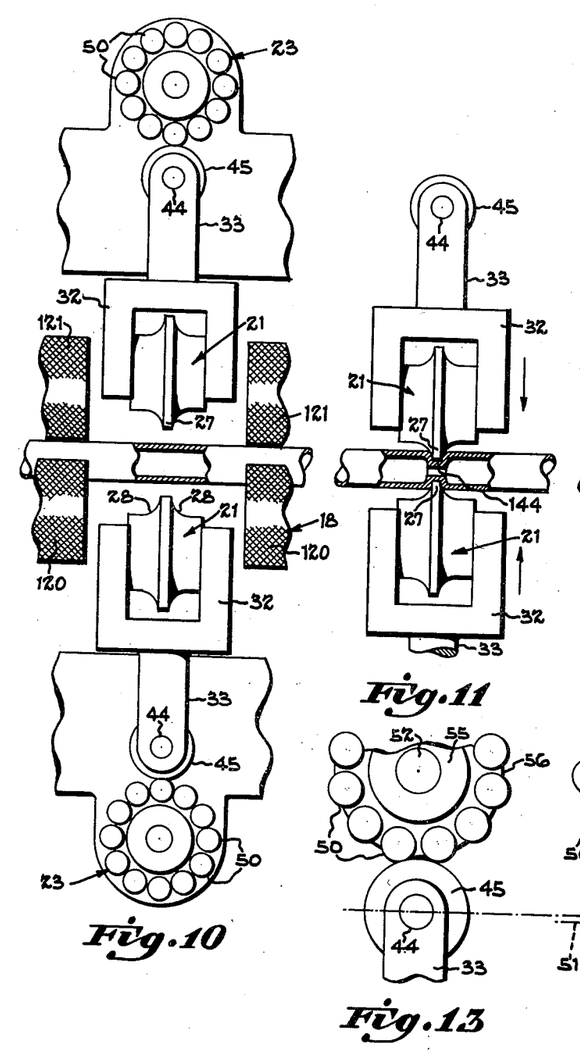
Figure 10 is an enlarged fragmentary diagrammatic view showing the swaging rollers and related mechanism with respect to a pipe at the beginning of the cycle.
Figure 11 is a view similar to Figure 10, showing the action of the swaging rollers with respect to the pipe during the swaging operation.
Figure 13 is an enlarged diagrammatic view showing the relationship of the rotary hammer and impact roller.
Figure 12:
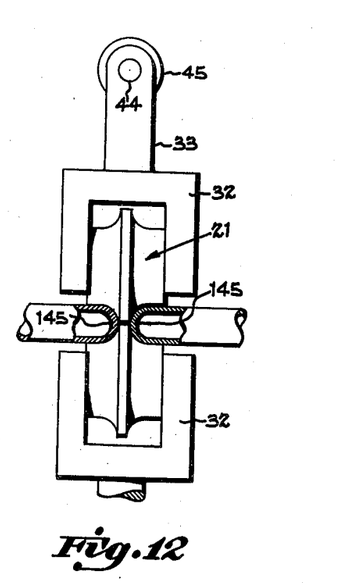
Figure 12 is a view showing the relationship of the parts at completion of the swaging operation.

As outlined above, the pipe closing and severing operation is performed by a pair of forming or swaging rollers which engage the heated rotating pipe on diametrically opposite sides, while the rollers are driven toward one another by high frequency impulses, as shown in Figures 10 to 12. The impulses acting upon the rollers causes them progressively to depress or constrict the cylindrical pipe wall towards its axis so as to impart to the wall a conical or a round shape corresponding to the complementary profiles of the forming rollers. This action is continued until the two swaging rollers meet and sever the pipe to form two closed end walls which have a thickness equal to or greater than the thickness of the pipe wall.

The swaging force is developed by the high frequency impulses imposed upon the rollers in a direction to drive them toward one another; however a follow-up motion is imparted to the rollers to keep them engaged against the pipe and to guide them during the swaging operation. While the rollers are acting upon the pipe, it is held in a position with its axis parallel to the axis of the swaging rollers and rotated as the rollers progressively swage and finally sever it.

Figure 8:
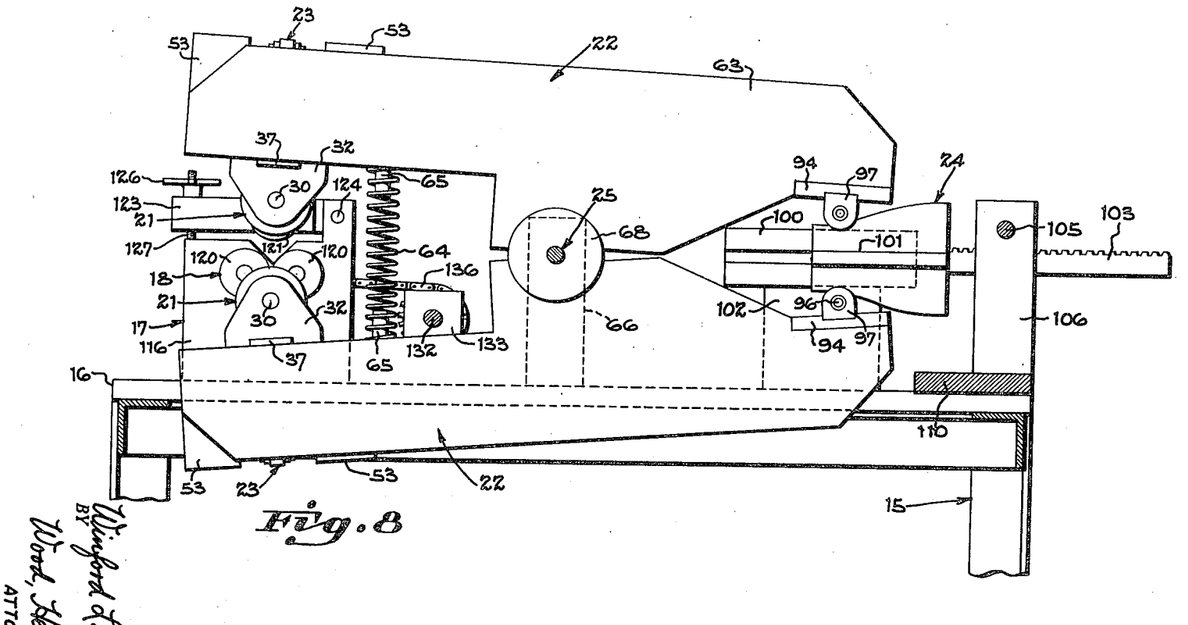
Figure 8 is a diagrammatic side elevation of the follow-up jaws and related mechanism, the jaws being shown in open position at the start of a pipe swaging operation.
Figure 9:
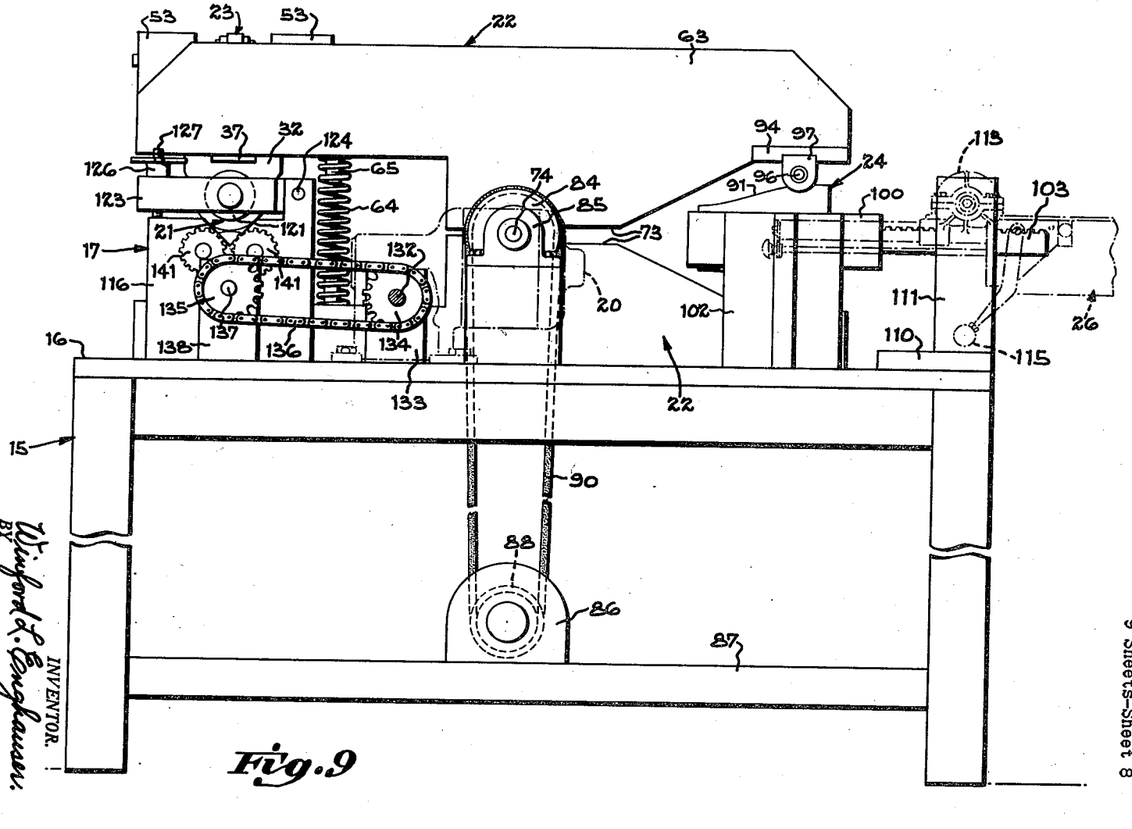
Figure 9 is a side elevation similar to Figure 8, showing the jaws in closed position at the end of a cycle of operation.

The general arrangement of the component parts is best shown in Figures 8 and 9, which disclose a preferred embodiment of the machine. Referring to Figure 9, a base generally indicated at 15 includes a top 16 which forms a support structure for the various parts of the machine. Upon the top 16 there is mounted a pipe rotating fixture 17 including regulating rollers 18 which engage the length of pipe at opposite end portions and rotate it upon its axis during the swaging operation. The regulating rollers are driven by the variable speed gear head motor, which is indicated generally at 20 in Figure 2. After the heated pipe is clamped in the fixture 17 and rotated, the swaging rollers, which are indicated generally at 21—21, move in toward the pipe from diametrically opposite sides so as to engage the heated malleable portion of the pipe which spans the spaced inner ends of the regulating rollers.

For this purpose the swaging rollers are mounted for movement upon the outer ends of respective upper and lower follow-up jaws 22—22 which are arranged in scissors fashion. The impulses are transmitted to the swaging rollers by means of upper and lower rotary hammers or die oscillators, indicated generally at 23—23 in Figure 3. These hammers are rotatably journalled upon the respective jaws and are driven from a common source of power, as explained later in detail. The swaging rollers are movable at right angles to the pipe axis within a limited range relative to the follow-up jaws under the impulses delivered to them by the rotary hammers: in other words, the rollers float and advance stepwise relative to the jaws under the impacts, while the jaws follow-up the stepwise progression of the rollers into the wall of the pipe and react against the impulses.

The follow-up motion is imparted to the jaws 22—22 by means of the follow-up cam 24 which advances lineally during the operation and forces the rearward ends of the jaws apart from the position shown in Figure 8 at the start of the operation, to the position shown in Figure 9 at the end of the operation. As shown, the two jaws are mounted at an intermediate axis, indicated generally at 25, such that the spreading movement at the rearward end forces the forward ends of the jaws toward one another. As explained later in detail, the driving system for the rotary hammers includes a common drive shaft journalled upon the axis 25 and providing a driving connection to the upper and lower rotary hammer.

It will be apparent from the foregoing, that the length of pipe is supported at opposite ends in fixed position above the top of the table and rotated during the swaging operation, and that the follow-up jaws move toward one another with respect to the fixed axis of the pipe under the influence of the follow-up cam. It will also be understood that the high frequency swaging force is delivered to the swaging rollers by the rotary hammers independently of the follow-up movement of the jaws since the rollers float relative to the jaws. The movement of the jaws therefore is dependent upon and responds to the stepwise incremental progress of the swaging rollers into the pipe walls.

In other words, the action of the follow-up cam upon the jaws prevents them from moving outwardly under the pressure reacting upon them during the outward or working stroke of the dies. On the other hand, the cam forces the jaws toward one another during the idle or return stroke of the dies and thus provides the follow-up action. It will also be understood that the speed of oscillation of the dies introduces impact forces of variable magnitude depending upon speed and stroke which contribute to the swaging action of the dies.

In order to provide a relatively flexible follow-up motion, the cam 24 is driven lineally by a rack and pinion, the pinion being rotated by a feed mechanism which rotates the pinion at a controlled rate. In the present disclosure a commercial power unit 26 (Figure 2) including an air operated piston, which has an adjustable rate of speed and stroke, is utilized to drive the follow-up cam. The design of the cam is such that the forces tending to separate the jaws are effectively resisted.

It will also be understood that the gear head motor 20 which rotates the regulating rollers is also adjustable as to speed of pipe rotation. Thus the feed unit 26 can be adjusted to suit various pipe diameters and rates of advancement of the swaging rollers suitable to different types of pipe. By properly correlating the speed of pipe rotation (motor 20) to provide the necessary lineal or surface speed, the machine can be set up quickly to swage the various diameters and types of pipe within its operating range at maximum speed and operating efficiency.

Swaging rollers

Figure 3:
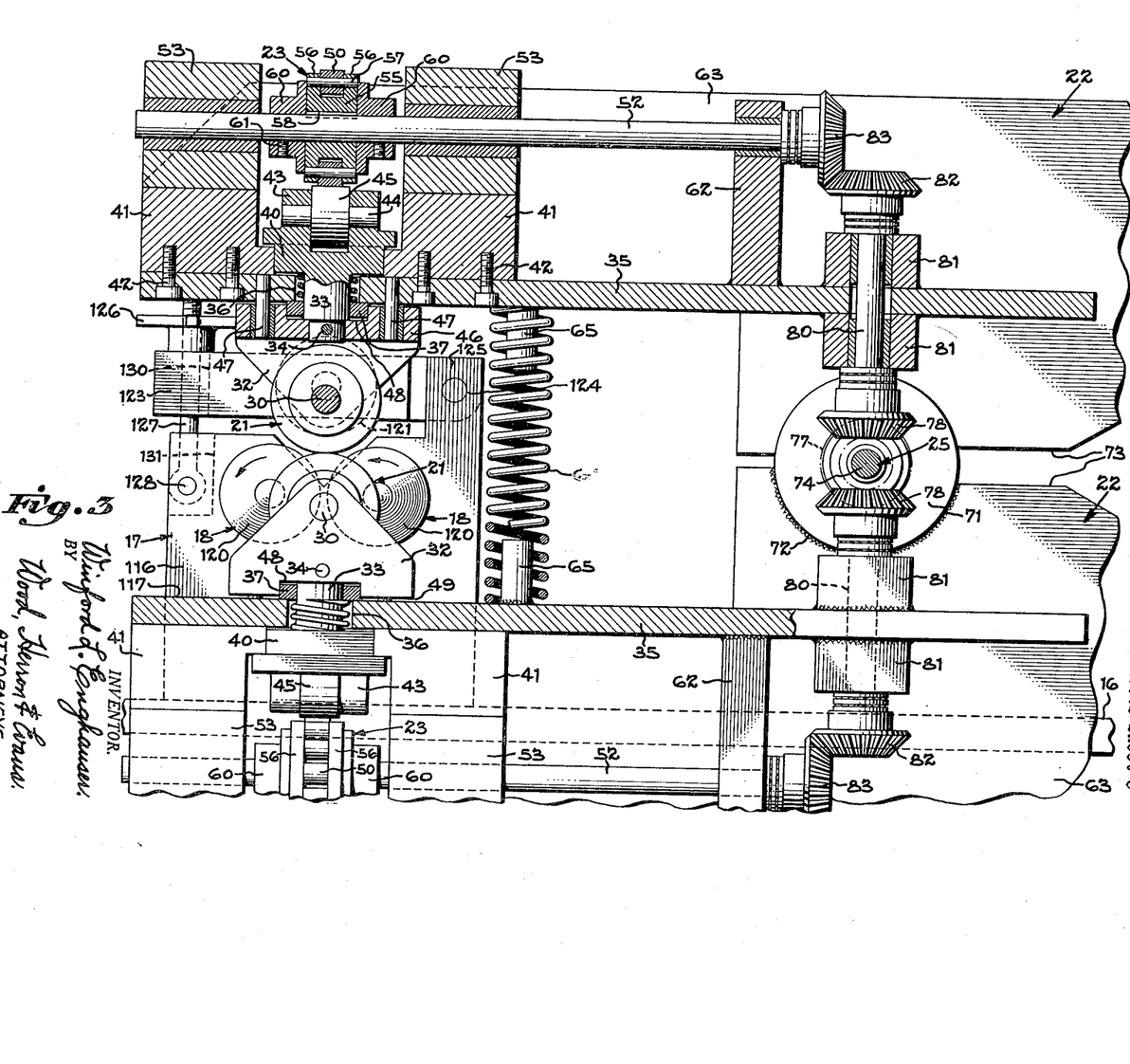
Figure 3 is an enlarged fragmentary sectional view taken on line 3—3, Figure 2, illustrating the pipe swaging mechanism and its driving system, the parts being shown in the closed position which they assume at completion of a swaging operation.
Figure 5:
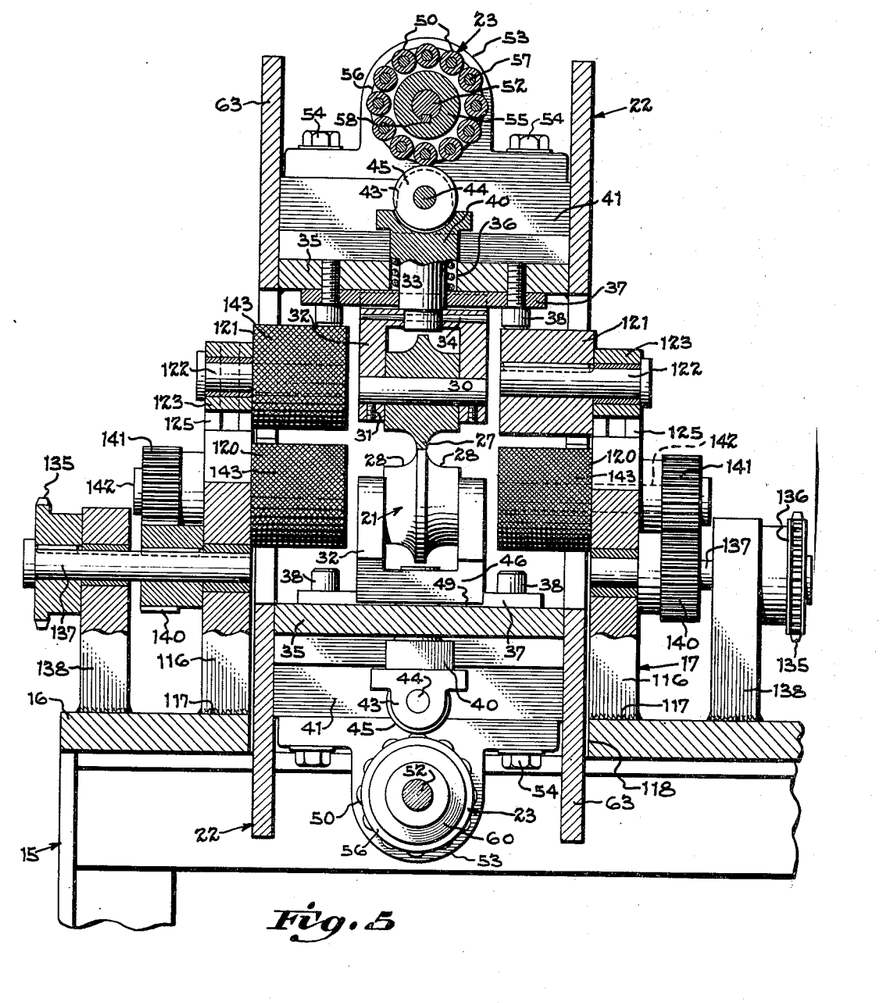
Figure 5 is an enlarged fragmentary sectional view taken on line 5—5, Figure 2, further detailing the swaging mechanism shown in Figure 3.

The arrangement of the top and bottom swaging rollers and their related rotary hammers is best disclosed in Figures 3 and 5 in which the parts are shown in the position they assume at the end of a swaging cycle. This relationship of the rollers corresponds with the position of the jaws and follow-up cam shown diagrammatically in Figure 9 and the progressive advancement of the rollers, from open to closed position, is shown diagrammatically in Figures 10 to 12 inclusive.

Since the construction of the jaws, swaging rollers and rotary hammers is identical for the top and bottom jaws, the following detailed description, which is directed to the top jaw assembly, also applies to the lower jaw assembly.

Referring to Figure 5, it will be noted that the swaging roller 21, as viewed in profile, is provided with a central, outwardly projecting rib or lobe 27 which is defined by the curved fillets 28—28 on opposite sides, blending with the periphery of the roller proper. Each fillet 28 preferably is developed upon a radius and extends in an arc from the periphery of the roller to the top of the rib. The profile of the two rollers, in the position shown in Figure 5, thus complement one another on opposite sides to provide two semi-circular swaging dies suitable to produce the two semi-spherical pipe ends shown in Figure 12 by the virtue of the rotation of the pipe during the swaging or forming operation. It will be understood that the swaging rollers are truly concentric and that they track upon and rotate with the pipe as they deform it.

As shown in Figures 3 and 5, each swanging roller is rotatably mounted upon a stub shaft 30 secured by set screws 31 to a vertically movable yoke 32. The upper end of the yoke is mounted upon the lower end of a vertical impulse shaft 33 by means of a taper pin 34. The shaft floats vertically or at right angles with respect to the follow-up jaw in which it is mounted, and is nonrotatably confined with respect to the jaw.

For this purpose the base plate 35 of the jaw includes a bore 36 which is considerably larger in diameter than the impulse shaft 33. A compression spring surrounds the shaft and has its lower end seated upon a spring retainer plate 37 which is fastened by screws 38 to the base plate 35. The upper portion of the impulse shaft includes a generally rectangular head portion indicated at 40 slidably confined in a rectangular opening formed in the bearing block 41, which is fastened by screws 42 to the base plate 35. The rectangular head portion 40 includes an upwardly extended yoke 43 having a shaft 44 which journals a rotatable impulse roller 45 in a position to be acted upon by the rotary hammer 23.

It will be apparent that the compression spring, by virtue of its engagement against the spring retainer plate and rectangular head 40, is effective to yieldably urge the impulse shaft assembly in a direction to cause the roller to bear against the periphery of the rotary hammer. Rotation of the hammer is therefore effective to impart to the impulse roller and swaging roller sustained, high frequency impulses with respect to the follow-up arm. In other words, the impulse shaft assembly is held by the compression spring in yieldable engagement with the rotary hammer while the follow-up movement of the jaw keeps the roller in contact with the rotating pipe as the swaging roller advances toward the central axis of the pipe. It will be understood that the lower impulse roller is acted upon by the lower rotary hammer simultaneously with the upper; thus the forces are imposed upon the pipe at opposite sides in opposition so as to substantially neutralize one another.

Referring to Figure 3, it will be noted that the cross member 46 of yoke 32 is slidably engaged at opposite ends by means of pins 47—47 to prevent rotary motion of the yoke about its vertical axis. It will also be noted that the spring retainer plate 37 is nested within a recess 48 formed in the cross member 46 of the yoke. It will be understood that the clearances which are indicated at 49 to allow the impulse shaft assembly to move vertically within a limited range relative to the follow-up jaw. The range of vertical motion is determined by the spacing and diameter of the cylindrical strikers 50 which are located at radial points about the circumference of the rotary hammer.

Figure 14:
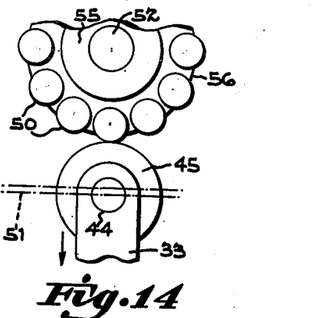
Figure 14 is a view similar to Figure 13, showing the advancement of the impact roller in response to rotation of the hammer.

The camming action of the strikers with respect to the impulse roller is indicated diagrammatically in Figures 13 and 14 and the amplitude or range or movement is indicated by the broken line 51. Line 51 indicates the maximum theoretical motion or feeding stroke which is developed by the camming action of the strikers with respect to the roller, but it will be understood that the amplitude may be modified by such factors as speed of rotation, spring return pressure and the degree of resistance to deformation of the malleable pipe wall. In practice it is found that a stroke ranging between .025″ and .050″ produces the best results in terms of speed and quality.

The rotary hammer 23 is mounted upon a driven shaft 52 which has its forward end rotatably journalled in the spaced pillow blocks 53—53. Pillow blocks 53 are mounted upon the bearing block 41 by screws 54. As best shown in Figure 3, the rotary hammer comprises a spool 55 provided with spaced flanges 56—56. The strikers or rollers 50 are confined between the flanges and are rotatably mounted upon pivot pins 57 which have their ends mounted in the flanges 56—56. The spool is keyed as at 58 to shaft 52 and the pivot pins are confined against axial complacement by means of the caps 60—60 which engage the opposite sides of the spool. The caps are secured in position by set screws 61 which bear against the shaft 52.

The rearward end of the drive shaft 52 is journalled in a bearing block 62 which is welded to the plate 35 and to the side rails 63—63 of the jaw. The side rails extend for the full length of the jaw and provide a rigid box-like structure in cross section. The upper and lower rotary hammers are both driven from a common source of power comprising a system of bevel gears, shown generally in Figure 3 and described in detail later.

As pointed out earlier, the follow-up jaws are pivoted angularly toward one another about the axis 25 by operation of the lineally movable cam 24. In order to separate the jaws, a compression spring 64 is mounted at the forward end of the jaws so as to bias the jaws with respect to the cam. The compression spring has its opposite ends confined by the pins 65—65 which are welded respectively to the plates 35—35. It will be understood that the jaws move angularly with respect to the pipe rotating fixture 17 which is mounted in stationary position upon the top 16 of the support structure. The arrangement and driving system of the regulating rollers 18 which form a part of the fixture 17 will be described in detail later.

Hammer driving system and jaw mounting

Figure 6:
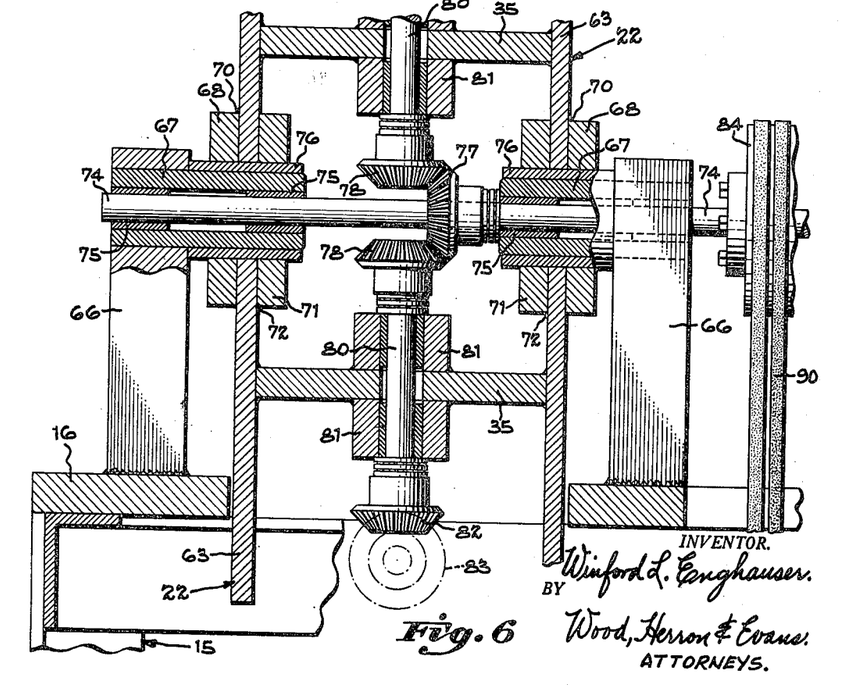
Figure 6 is an enlarged sectional view taken on line 6—6, Figure 2, detailing the pivotal mounting of the follow-up jaws and a portion of the driving system which is common to the rotary hammers of both jaws.

Referring to Figure 6, it will be noted that the upper and lower follow-up jaws 22—22 are both mounted in comon upon the bearing posts 66—66 which are welded at their lower ends to the top member 16. Each post includes a sleeve 67 projecting inwardly upon a horizontal axis toward the side rails 63—63 of the jaws. The top jaw is provided with a pair of bearings 63—68 which are welded as at 70 to the outer surface of the side rails 63. The lower jaw includes a similar pair of bearings 71—71 which are welded as at 72 to the inner surface of the side rails 63. As shown in Figure 3, the adjoining edges 73 of the side rails are spaced apart in order to provide clearance for the scissors motion of the jaws. It will be noted in Figure 3 that the bearing 71 is welded only to the lower jaw and is rotatable with respect to the upper jaw. In a similar maner the bearings 68 are welded only to the upper jaw and are rotatable with respect to the lower jaw. This arrangement disposes the side rails in the same vertical plane and provides the pivotal movement of the jaws with respect to one another upon the sleeves 67.

The driving system for the rotary hammers includes the horizontal shaft 74 which is journalled at opposite ends within the horizontal sleeves 67—67. Bushings 75 are provided inside the sleeve to journal the shaft, and external bushings 76 are provided to journal the jaws. The shaft 74 includes a bevel gear 77 which is keyed to the shaft and which meshes in common with the bevel gears 78—78. Bevel gears 78 are keyed to the respective vertical shafts 80—80, the shafts being journalled in bosses 81 which are welded to the plates 35 of the respective jaws.

Referring now to Figure 3, it will be noted that the opposite ends of the shafts 80 are provided with bevel gears 82—82 meshing with bevel gears 83—83 which are fastened to the shafts 52—52 of the rotary hammers. Since the drive shaft 74 is centered upon the pivotal axis of the jaws, it will be apparent that the driving system drives both the upper and lower hammer in common and also permits the rocking motion of the jaws with resepct to one another.

Figure 1:
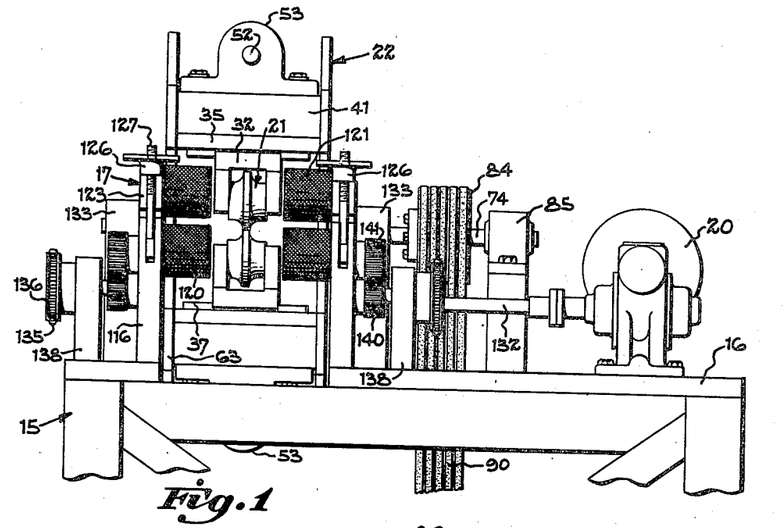
Figure 1 is a general front elevation of the pipe swaging machine.

Power is applied to the driving ssytem by way of the V-belt pulley 84 which is secured upon the outer end of drive shaft 74. As shown in Figure 1, pulley 84 is of the multiple type and the drive shaft derives additional support from the outboard bearing 85 which rises vertically from the top member 16. As shown in Figure 9, a motor 86 is mounted beneath the top member 16 upon a horizontal frame 87. The motor shaft includes a multiple V-belt pulley 88 which is connected by the belts 90 to pulley 84 to complete the driving system to the rotary hammers.

It will be noted that several bevel gears of the driving system are of the same pitch diameter so that a one to one drive ratio from shaft 74 to the hammers is provided. In the present example, motor 86 drives the rotary hammers at a speed of 300 R. P. M., and the hammers are provided with 12 strikers or impulse rollers and at the indicated speed will develop impulses at the rate of 3,600 per minute. It will be obvious, of course, that the rate or frequency of impulses can be varied according to requirements by properly regulating the motor speed.

Jaw feeding mechanism

As explained earlier, the follow-up jaws are fed toward one another concurrently with the rotation of the hammers during each swaging cycle in order to guide and keep the swaging rollers in contact with the pipe as the wall is deformed. This motion is imparted to the jaws by the follow-up cam 24 and its associated parts which move the jaws counter to the resistance of the compression spring, which is interposed between the front ends of the jaws. The cam 24 is advanced lineally by means of the power unit 26 (Figure 2) which consists of a commercial air operated assembly which is provided with means for conveniently adjusting the feed rate.

Figure 4:
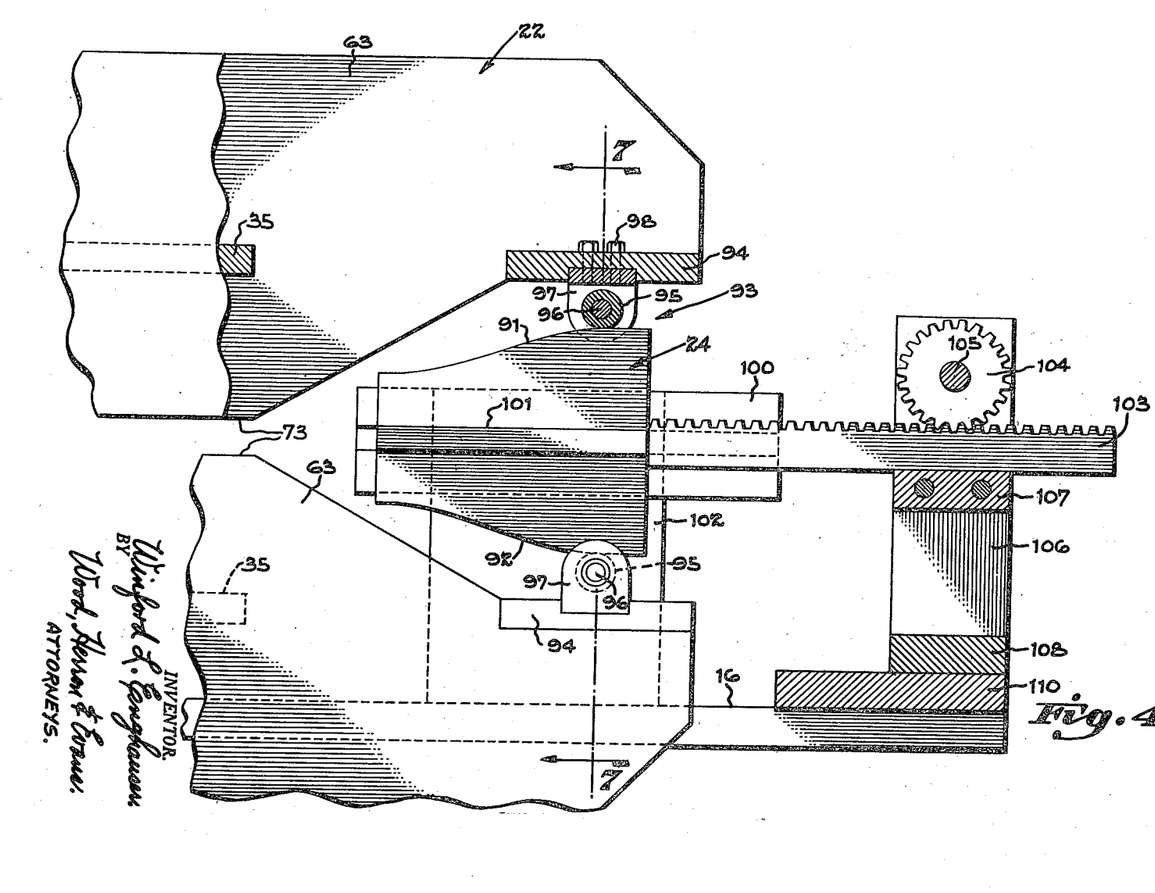
Figure 4 is an enlarged fragmentary sectional view taken on line 4—4, Figure 2, illustrating the cam structure at the rearward end of the jaws, which provides the follow-up movement of the jaws during the swaging operation.
Figure 7:
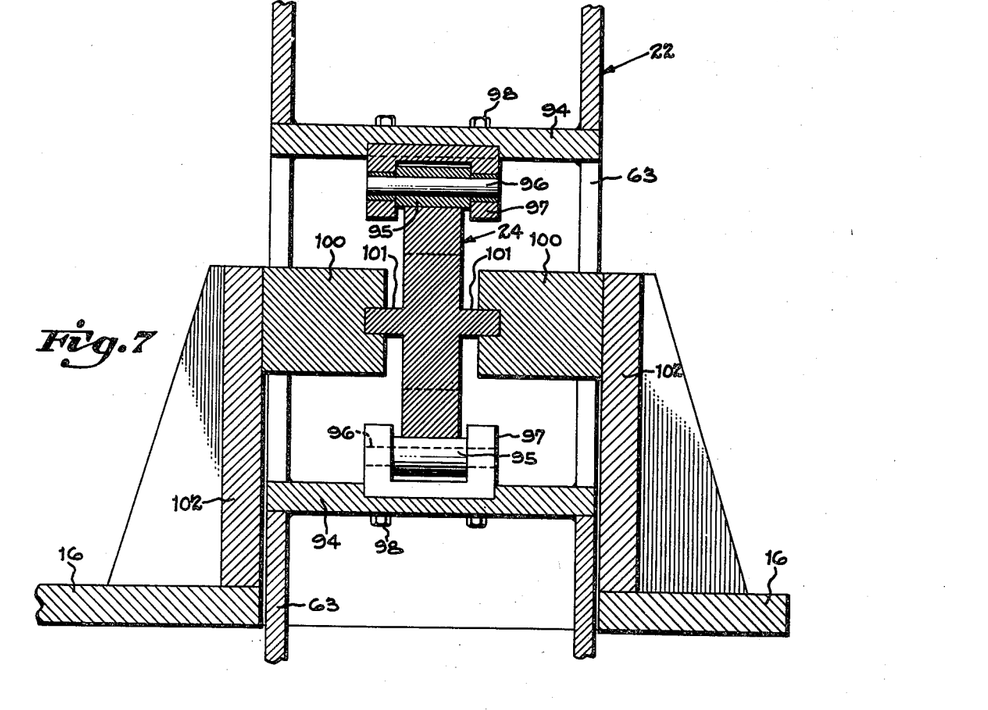
Figure 7 is a sectional view taken on line 7—7, Figure 4, detailing the cam and roller arrangement at the rearward end of the follow-up jaws.

Referring to Figures 4 and 7, it will be noted that the follow-up cam is generally flared in width from its front end toward its rearward end, providing the upper and lower tracking surfaces indicated at 91 and 92. The rearward ends of the jaws are shaped to provide the open throat 93 which provides clearance for entry of the cam between the jaws. Respective cross members 94—94 are secured to the rearward ends of the jaws to provide a mounting structure for the cam rollers 95—95 which track upon the flared upper and lower faces of the cam. The rollers are journalled upon shafts 96—96, and the shafts are mounted in the yokes 97—97 which are secured by screws 98 to the cross members. It will be apparent that lineal movement of the cam in the forward direction will swing the jaws to closed position and that the jaws will open upon rearward motion of the cam under the influence of the compression spring 64.

As best shown in Figure 7, the cam is slidably mounted for horizontal movement in the guide blocks 100—100. For this purpose the cam is provided with rails 101—101 along opposite sides which slidably interfit the respective slots formed in the outer ends of the guide blocks. The blocks are mounted upon the upper ends of vertical support brackets 102—102 which have their lower ends welded to the top member 16.

The cam is shifted lineally by the rack 103 which has its forward end welded or otherwise secured to the cam (Figure 4). As shown, the rack engages a pinion 104 which is keyed upon a shaft 105, the shaft being journalled in the spaced upright bearing brackets 106—106. The rack is held in engagement with respect to the pinion by means of a cross plate 107 which has its opposite ends attached to the brackets 106—106. The lower end of the bearing blocks 106 are joined together by a cross bar 108, welded or otherwise secured upon a plate 110 which is fastened to the top member 16.

Figure 2:
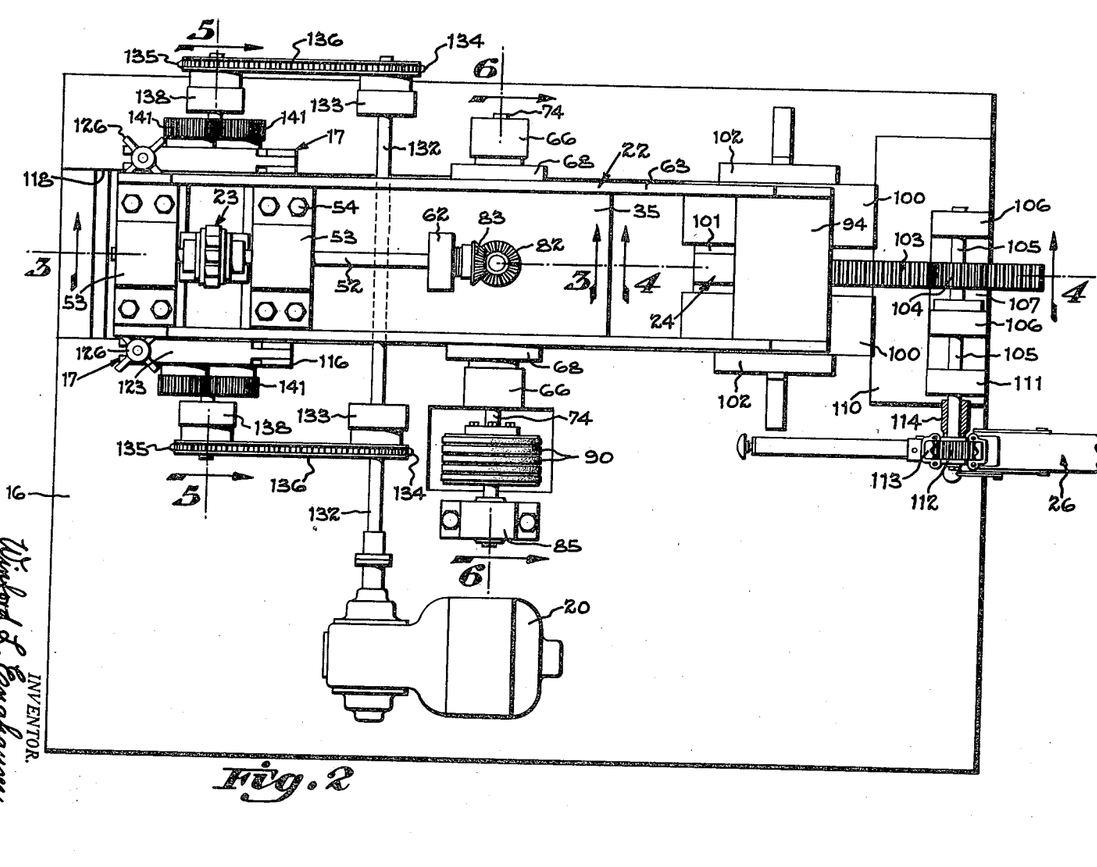
Figure 2 is a general top plan view of the machine illustrating generally the location and arrangement of its parts.

As viewed in Figures 2 and 9, the shaft 105 is rotatably connected to the power feed unit 26 noted earlier. For this purpose an outboard bearing 111 (Figure 2) supports an extended end of shaft 105. A pinion 112 is keyed to the outer end of the shaft, and feed unit 26 includes a rack (not shown) which meshes with the pinion and thus rotates shaft 105. The rack is reciprocated by a piston which is slidably confined within an air cylinder forming part of the feed unit. The pinion 112 forms a part of the feed unit and is enclosed in a housing 113 which includes a hub 114 journalled on shaft 105.

Since the feed unit is a commercial product, its construction is not disclosed in detail. However, it will be understood that the unit includes means for regulating the working stroke and the rate of motion of the rack. This makes it possible to vary the effective stroke of the follow-up jaws if necessary, and to regulate the rate of jaw movement as dictated by variable factors such as the type and thickness of the pipe wall. In addition the feed unit includes a control handle 115 (Figure 9) which provides forward and rearward motion in response to lever movements.

In the present disclosure the lever is operated manually but it will be understood that suitable linkage can be incorporated in the machine to cooperate with the pipe clamp 17 for automatic operation. From the present disclosure it will be understood that the jaws are shifted to open position when the control lever is placed in one position and are fed at a controlled feeding rate toward closed position when the lever is shifted to its second position. It will also be understood that the feeding rate is adjusted to a factor which coincides with the swaging rate of the rollers in order that they may be maintained in contact with the pipe wall during the follow-up motion as explained earlier.

Pipe rotating mechanism

As indicated above, the length of pipe to be swaged and severed is placed in the fixture 17 to be rotated upon its axis while the heated malleable portion is acted upon by the swaging rollers. Commercial pipe, for which the machine is primarily intended, is fabricated from flat metal stock which is rolled to cylindrical shape. After rolling, the edges of the rolled stock are welded together to form a seam. The seam is slightly weaker than the body of the pipe and ordinarily in a certain percentage of pipe, tends to be disrupted by torque force imposed upon the pipe. The present pipe rotating mechanism is arranged to frictionally engage the cold outer portions of the pipe and to rotate the pipe by driving the cold portions at uniform speeds without imposing any torque force upon the malleable central zone which is acted upon by the swaging rollers.

Described in detail with reference to Figures 3 and 5, the pipe rotating mechanism includes a pair of spaced side plates 116—116 which have their lower edges welded as at 117 to the top member 16. These plates reside at the forward end of the follow-up jaws and are spaced outwardly with respect to the side rails 63 of the jaws so that the jaws are free to move in the vertical plane with respect to the vertical plates. In Figure 5 it will be noted that the top member 16 includes an opening 118 to allow the lower jaws to move downwardly below the plane of the top member.

Each plate includes a pair of knurled regulating rollers 120—120 which impart rotary movement to the pipe. The respective pair of lower rollers are driven in the same direction so as to impart rotary motion to the section of pipe when it is clamped against the rollers. The clamping pressure is applied by respective pressure rollers 121—121, one for each pair of drive rollers. The clamping rollers are disposed above the driving rollers upon an axis which is located between the axes of the driving rollers as shown in Figure 3.

As shown in Figure 5, the respective sets of regulating rollers are spaced transversely from one another to provide clearance for the swaging rollers and the yokes upon which they are mounted. The pipe is placed across the rollers with the heated maleable portion located centrally between the rollers in position to be acted upon by the swaging rollers.

In Figure 5, it will be noted that the pressure rollers are journalled upon shafts 122—122 which are rotatably mounted in the respective clamping bars 123—123. Referring to Figure 3, it will be noted that the rearward end of the clamping bar is pivotally mounted as at 124 with respect to the spurs 125—125 rising upwardly from the side plates 116—116. This permits the pressure rollers to be raised and lowered with respect to the driving rollers to allow entry of the pipe.

Pressure is applied by means of the hand grip nuts 126—126 which are threaded upon the screws 127—127. The lower end of each screw 127 is pivotally mounted as at 128 with respect to the side plates, and both the side plates and bars are slotted as at 130 and 131 to allow the screw to be swung outwardly upon release of pressure. When the pipe is inserted between the sets of rollers, the nuts 126 are arranged to be loosened and the screws swung outwardly to allow the pipe to be placed in operating position from the front of the machine with the pressure rollers resting upon it. The screws are then swung to their vertical positions and are tightened to apply a uniform clamping pressure upon both end portions of the pipe.

The driving system of the regulating rollers 120—120 is shown generally in Figure 2 and is powered by the variable speed gear head motor 20, previously noted. As shown, the motor is coupled to a common drive shaft 132 which is journalled in the bearing blocks 133—133 supported upon the top member 16. A pair of sprockets 134—134 is keyed to the shaft at opposite ends and the respective sprockets are connected to a pair of driven sprockets 135—135 by means of sprocket chains 136—136.

As detailed in Figure 5, the sprockets 135—135 are keyed upon stub shafts 137—137 which are journalled at opposite ends in the bearing blocks 138 and in the side plates 116 of the pipe fixture 17. Each stub shaft includes a gear 140 which is interposed between the bearing block and side plate, each gear 140 being keyed to its shaft 137 and being meshed in common with a pair of driven gears 141—141.

The driven gears 141—141 are mounted upon the outer ends of stub shafts 142, one for each driven roller 120, and the shafts 142 are journaled in the side plates 116—116. It will be understood that the respective pairs of driven gears 141—141 mesh in common with the driving gear 140, and that the two gears 141—141 rotate in the same direction since they are not meshed with one another. Thus the driving rollers are rotated in the same direction and at the same rate of speed to impart rotary movement to the pipe which is clamped in tracking engagement upon the rollers. It will be noted that the periphery of each driving and pressure roller is roughened or knurled as at 143 in order to provide frictional engagement with the pipe.

The present disclosure represents a machine which is suitable to perform the swaging operation by hand regulation of the several components in proper sequence. Accordingly, the heated length of pipe is placed in operating position with the pressure rollers released and with the follow-up jaws open. After the pipe is placed in position, the pressure rollers are clamped down upon the pipe.

If desired both the driving motor for the regulating rollers and the motor for the rotary hammers may be energized continuously while the machine is in operation. After the pipe is placed in the pipe clamp, the control lever 115 is shifted to a position to move the jaws at preselected speed from the open position toward closed position, corresponding to Figures 10 to 12 inclusive. When the swaging operation is completed, as shown in Figure 12, the control lever 115 is reversed so as to open the follow-up jaws, and the pressure roller is then unclamped to allow the two swaged pipes to be removed.

The actual swaging operation is extremely rapid and is completed in a matter of seconds after the follow-up jaws are placed in operation. It will be understood, of course, that the swaging rollers are ground to a fine finish and that they track freely with respect to the pipe to impart a smooth surface finish to the closed ends of the pipe. The swaging rollers are constructed preferably of hardened tool steel and have a profile suitable to form a spherical end wall; however, it will be apparent that the profile can be modified to produce other shapes such as irregular curves or tapers if desired.

As indicated in Figure 11, the central lobes 27 of the swaging rollers begin to constrict the malleable portion of the pipe for a relatively narrow extent at the start of the operation, as indicated at 144. It will be observed that the roller fillets progressively constrict the wall as the rollers advance toward one another to form the rounded wall and that the rounded end wall corresponds to the complementary profile formed by the two rollers at the final pinch-off operation, as shown in Figure 12. It will be apparent that the constricted portion 144, indicated in Figure 11, is forced or crowded back into the pipe wall, thus causing the rolled ends (Figure 12) to be progressively thicker toward center, as indicated at 145.

As explained earlier, swaging the standard welded iron pipes by the spinning method practiced in the past, produced certain percentage of the pipes having leaks at the swaged end because of the twisting force imposed by the tool upon the rotating pipe. According to the present mode of operation, this twisting force is eliminated since the two end portions of the pipe are engaged and rotated in unison by the regulating rollers, and the swaging rollers impose no twisting force since they track freely upon the rotating pipe.

As explained above, the machine of the present disclosure is suitable to perform the swaging operation under manual control, and best illustrates the operating principles of the invention. However, it is contemplated to adapt the machine to the rapid production of closed pipes, in which case the pressure rollers will be operated by power and that the control lever 115 of the feed unit will be interconnected with the regulating roller control in order to provide coordinated operation of the follow-up jaws and regulating rollers. By this arrangement, a single lever may be provided at the front of the machine which is adapted to initiate each cycle of operation in a convenient manner. In addition, it is contemplated to provide a mechanism for continuously heating and feeding the pipes to the regulating rollers such that the cycle is automatic, except for the replenishing of pipe stock and the removal of the swaged pipes from the machine.

Having described my invention, I claim:

1. In a machine for forming two closed end pipes from a length of open ended pipe by swaging a malleable portion of the pipe, a base, pipe support means rotatably mounted on the base and having an opening to confine an end portion of the pipe, a driving system connected to the pipe support means for rotating the support means and pipe about its axis, a pair of spaced follow-up members mounted upon the base and located at opposite sides of the axis of rotation of the pipe, a respective impact shaft slidably confined in said follow-up members, each impact shaft having inner and outer end portions projecting through the follow-up members, said shafts disposed upon a common axis intersecting the said axis of rotation of the pipe, a respective swaging die mounted upon the inner end portions of said impact shafts, said dies having complementary profiles comprising a face having opposite sides which flare outwardly from said face, a respective die oscillator mounted upon the follow-up members adjacent the outer end portions of the impact shafts, said oscillators each having movable impact elements which are propelled along a path which coincides with the outer end portions of the impact shafts, power means connected to the die oscillators for moving said impact elements at high velocity in said path, thereby to strike the end portions of the impact shafts and drive said swaging dies toward one another in stepwise increments, and actuating means connected to said follow-up members for shifting the same toward one another at a rate correlated to the advancement of the dies, thereby to maintain the swaging dies in contact with the rotating pipe as the pipe wall is swaged.

2. In a machine for forming two closed end pipes from a length of open ended pipe by swaging a malleable portion of the pipe, a base, a plurality of spaced regulating rollers rotatably mounted on the base and engageable about the periphery of an end portion of the pipe, a driving system connected to the said regulating rollers for rotating the rollers and pipe about its axis, a pair of spaced follow-up members mounted upon the base and located at opposite sides of the axis of rotation of the pipe, a respective impact shaft slidably confined in said follow-up members, each impact shaft having inner and outer end portions projecting through the follow-up members, said shafts disposed upon a common axis intersecting said axis of rotation of the pipe, a respective swaging die mounted upon the inner end portions of said impact shafts, said dies having complementary profiles comprising a face having opposite sides which flare outwardly from said face, respective rotary hammers rotatably mounted upon the follow-up members adjacent the outer end portions of the impact shafts, said rotary hammers each having impact elements on the periphery thereof which are propelled about a circular path which is intercepted by the outer end portions of the impact shafts, power means connected to the rotary hammers for rotating the same, whereby the said impact elements engage the end portions of the impact shafts to drive said shafts and swaging dies toward one another in stepwise increments, and actuating means connected to said follow-up members for shifting the same toward one another at a rate correlated to the advancement of the dies, thereby to maintain the swaging dies in contact with the rotating pipe as the pipe wall is swaged.

3. In a machine for forming two closed end pipes from a length of open ended pipe by swaging a malleable portion of the pipe, a base, a plurality of spaced regulating rollers rotatably mounted on the base and engageable about the periphery of an end portion of the pipe, a driving system connected to the said regulating rollers for rotating the rollers and pipe about its axis, a pair of spaced follow-up members mounted upon the base and located at opposite sides of the axis of rotation of the pipe, a respective impact shaft slidably confined in said follow-up members, each impact shaft having inner and outer end portions projecting through the follow-up members, said shafts disposed upon a common axis intersecting said axis of rotation of the pipe, a respective swaging roller rotatably mounted upon the inner end portions of said impact shafts, said swaging rollers having complementary profiles each comprising a face having opposite sides which flare outwardly from said face to the periphery of the roller, respective rotary hammers rotatably mounted upon the follow-up members adjacent the outer end portions of the impact shafts, said rotary hammers each having impact elements which are propelled about a circular path which is intercepted by the outer end portions of the impact shafts, power means connected to the rotary hammers for rotating the same, whereby the said impact elements engage the end portions of the impact shafts to drive said shafts and swaging rollers toward one another in stepwise increments, and actuating means connected to said follow-up members for shifting the same toward one another at a rate correlated to the advancement of the swaging rollers, thereby to maintain the swaging rollers in contact with the rotating pipe as the pipe wall is swaged.

4. A machine for forming two closed end pipes from a length of open ended pipe comprising a base, a pair of swaging rollers, a pair of follow-up jaws mounting said swaging rollers, pivot means connecting said jaws to the base, a respective impulse shaft for each of said rollers, said swaging rollers being pivotally mounted upon the impulse shafts, said impulse shafts being slidably mounted in said respective jaws for movement of the impulse shafts and swaging rollers relative to said jaws, a respective rotary hammer journalled on said jaws adjacent the outer ends of said impulse shafts, striker elements mounted on said rotary hammers and movable about a circular path which is intercepted by the outer ends of the impulse shafts to oscillate the impulse shafts and swaging rollers relative to the follow-up jaws, a motor connected in common to both of said rotary hammers to drive both of said rotary hammers in unison, a plurality of regulating rollers rotatably mounted on the base, said regulating rollers engageable with the periphery of the length of pipe at opposite ends to rotate the same about its axis in a position to be engaged on opposite sides by said swaging rollers, whereby the oscillating swaging rollers are effective to swage the pipe wall, and means connected to the follow-up jaws for feeding said follow-up jaws and swaging rollers toward said rotating pipe as the swaging rollers swage the pipe wall.

5. A machine for forming two closed end pipes from a length of open ended pipe comprising a base, a pair of swaging rollers, a pair of follow-up jaws mounting said swaging rollers, pivot bearings connecting said jaws to the base, a respective impulse shaft for each of said rollers, said swaging rollers being pivotally mounted upon the impulse shafts, said impulse shafts being slidably mounted in said respective jaws for movement of the impulse shafts and swaging rollers relative to said jaws, a respective rotary hammer journalled on said jaws adjacent the outer ends of said impulse shafts, each of said rotary hammers having striker elements movable about circular paths which are intercepted by the outer ends of the impulse shafts to oscillate the impulse shafts and swaging rollers relative to the follow-up jaws, a motor connected in common to both of said rotary hammers to drive both of said rotary hammers in unison, a plurality of regulating rollers rotatably mounted on the base, said regulating rollers engageable with the periphery of a length of pipe at opposite ends, power means connected to the regulating rollers for rotating the pipe about its axis in a position to be engaged on opposite sides by said swaging rollers, whereby the oscillating swaging rollers are effective to swage the pipe wall, a second motor connected to said regulating rollers and adapted to drive the same, a cam engaged in common upon both of said follow-up jaws adapted to shift the follow-up jaws toward one another during the oscillation of said swaging rollers, and power means connected to said cam and adapted to actuate the same and to shift the follow-up jaws toward one another at a rate to maintain the swaging rollers in engagement upon the pipe wall as the rollers swage the pipe wall.

6. A machine for forming two closed end pipes from a length of open ended pipe by a swaging operation, said machine comprising a base, a pair of relatively elongated follow-up jaws, pivotal mounting means on said base supporting said jaws for movement with respect to one another, a plurality of regulating rollers mounted upon said base, said regulating rollers being adapted to engage the periphery of a length of pipe and rotate the same about its axis, a pair of swaging rollers carried upon the respective outer ends of said jaws adapted to engage the rotating pipe on opposite sides to swage the same, respective impact shafts having inner ends rotatably mounting said swaging rollers, said impact shafts slidably engaged in the respective outer ends of the follow-up jaws, the impact shafts having outer end portions projecting through the follow-up jaws, a respective rotary oscillator journalled upon the outer end of each of said jaws, said oscillators being disposed adjacent the outer end portions of said impact shafts, a series of striker elements mounted about the periphery of the rotary oscillators, the striker elements movable about respective circular paths which are intercepted by the outer ends of the impact shafts to impart oscillating motion to the impact shafts and swaging rollers relative to the jaws upon rotation of the oscillators, a driving system connected to said rotary oscillators to rotate the same, and means connected to said follow-up jaws to move the outer ends of said jaws toward one another during said swaging operation.

7. A machine for forming two closed end pipes from a length of open ended pipe by a swaging operation, said machine comprising a base, a pair of relatively elongated follow-up jaws, pivotal mounting means on said base supporting said jaws intermediate their length for movement with respect to one another in scissors fashion, a plurality of regulating rollers rotatably mounted upon said base, said regulating rollers being engageable about the periphery of a length of pipe to rotate the same about its axis, a pair of swaging rollers carried upon the respective forward ends of said jaws and disposed on opposite sides of said axis to engage the rotating pipe on opposite sides and to progressively swage the same, respective impact shafts having inner ends rotatably mounting said swaging rollers, said impact shafts slidably passing respectively through the forward ends of the follow-up jaws, said shafts having outer end portions projecting through said jaws, a respective rotary oscillator journalled upon each of said jaws, said oscillators being disposed adjacent the outer end portions of the impact shafts which project through said jaws, a series of striker elements mounted about the periphery of the rotary oscillators, the striker elements movable about respective circular paths which are intercepted by the outer end portions of the impact shafts to impart oscillating motion to the impact shafts relative to the jaws upon rotation of the oscillators, a driving system connected to said rotary oscillators to rotate the same, a follow-up cam disposed between the rearward ends of said follow-up jaws, the cam having a diverging face engageable with the rearward ends of said jaws to move the same outwardly with respect to one another and thereby to move the forward ends of the jaws inwardly toward one another, and means connected to said cam to advance the cam in the direction of said diverging face, thereby to actuate the jaws during the swaging operation.

8. A machine for forming two closed end pipes from a length of open ended pipe by a swaging operation, said machine comprising a base, a pair of relatively elongated follow-up jaws, pivotal mounting means on said base supporting said jaws intermediate their length for movement with respect to one another in scissors fashion, a plurality of regulating rollers rotatably mounted upon said base, said regulating rollers being engageable about the periphery of a length of pipe to rotate the same about its axis, a pair of swaging rollers carried upon the respective forward ends of said jaws and disposed on opposite sides of said axis to engage the rotating pipe on opposite sides, respective impulse shafts rotatably mounting said swaging rollers, said impulse shafts each having an outer end slidably passing through the forward ends of the follow-up jaws, a respective rotary oscillator journalled upon each of said jaws, said oscillators being disposed adjacent the outer ends of the impulse shafts which project through said jaws, each of said oscillators having striker elements mounted on the periphery thereof movable in respective circular paths which are intercepted by the outer ends of the impulse shafts to impart oscillating motion to the impulse shafts upon rotation of the oscillators, a driving system connected to said rotary oscillators to rotate the same, said driving system including a drive shaft rotatably journalled upon the pivotal axis of said follow-up jaws, whereby the jaws pivot about said axis during rotation of the drive shaft, respective driven shafts journalled upon said jaws and having ends in driving connection with the drive shaft, said driven shafts having opposite ends in driving connection with the oscillators, and means connected to said follow-up jaws to move the forward ends of said jaws in scissors fashion toward one another during said swaging operation.

9. A machine for forming two closed end pipes from a length of open ended pipe by a swaging operation, said machine comprising a base, a pair of relatively elongated follow-up jaws, pivotal mounting means on said base supporting said jaws intermediate their length for movement with respect to one another in scissors fashion, a plurality of regulating rollers rotatably mounted upon said base, said regulating rollers being engageable about the periphery of a length of pipe to rotate the same about its axis, a pair of swaging rollers carried upon the respective forward ends of said jaws and disposed on opposite sides of said axis to engage the rotating pipe on opposite sides, respective impulse shafts rotatably mounting said swaging rollers, said impulse shafts each having an outer end slidably passing through the forward ends of the follow-up jaws, a respective rotary oscillator journalled upon each of said jaws, said oscillators having striker elements movable in respective circular paths which are intercepted by the outer ends of the impulse shafts to impart oscillating motion to the impulse shafts upon rotation of the oscillators, a driving system connected to said rotary oscillators to rotate the same in unison, said driving system including a drive shaft rotatably journalled upon the pivotal axis of said follow-up jaws, a drive gear keyed to the drive shaft, a respective oscillator shaft journalled upon each of said jaws, said oscillators being keyed respectively to said shafts, a driven gear in driving connection with each of said oscillator shafts, said driven gears being meshed in common with said drive gear and movable with the follow-up jaws about the drive gear during pivotal motion of the jaws, and means connected to said follow-up jaws to pivot the jaws in scissors fashion and move the forward ends thereof toward one another during the swaging operation.

References Cited in the file of this patent

UNITED STATES PATENTS 509,730  Griffin ---------------- Nov. 28, 1893